United States Patent [19]

Iwanami et al.

[11] Patent Number: 5,216,054
[45] Date of Patent: Jun. 1, 1993

[54] POLYMER COMPOSITION

[75] Inventors: Kunio Iwanami, Yokohama; Kissho Kitano, Kawasaki; Yukihiko Yagi, Yokohama; Takashi Mikami, Komae, all of Japan

[73] Assignee: Tonen Sekiyukagaku Kabushiki Kaisha, Tokyo, Japan

[21] Appl. No.: 841,203

[22] Filed: Feb. 27, 1992

Related U.S. Application Data

[63] Continuation of Ser. No. 476,901, Feb. 8, 1990, abandoned.

[30] Foreign Application Priority Data

Feb. 10, 1989 [JP] Japan ..................... 1-31996

[51] Int. Cl.$^5$ ..................... C08K 5/5393; C08K 5/523
[52] U.S. Cl. ..................... 524/120; 524/126; 524/194; 524/222; 524/291
[58] Field of Search ............. 525/66; 524/120, 126, 524/222, 194, 291

[56] References Cited

U.S. PATENT DOCUMENTS

| | | | |
|---|---|---|---|
| 3,437,641 | 4/1969 | Lenz et al. | 528/47 |
| 3,660,438 | 5/1972 | Dexter | 524/194 |
| 3,677,965 | 7/1972 | Dexter et al. | 524/222 |
| 3,691,131 | 9/1972 | Klemchuk | 524/222 |
| 3,772,245 | 11/1973 | Dexter | 524/194 |
| 3,773,830 | 11/1973 | Dexter | 564/150 |
| 3,954,847 | 5/1976 | Hofer | 524/126 |
| 4,305,865 | 12/1981 | Okada et al. | 525/66 |
| 4,362,846 | 12/1982 | Korber et al. | 525/66 |
| 4,612,222 | 9/1986 | Gaitskell | 525/66 |
| 4,613,647 | 9/1986 | Yonaiyama et al. | 525/66 |
| 4,670,493 | 6/1987 | Ashbroeck et al. | 524/120 |

FOREIGN PATENT DOCUMENTS

| | | |
|---|---|---|
| 008729 | 3/1980 | European Pat. Off. . |
| 340040 | 11/1989 | European Pat. Off. . |
| 2017897 | 10/1970 | Fed. Rep. of Germany . |
| 1259094 | 1/1986 | Fed. Rep. of Germany . |
| 55-165952 | 12/1980 | Japan . |
| 61-103954 | 5/1986 | Japan . |
| 62-223250 | 10/1987 | Japan . |

*Primary Examiner*—Veronica P. Hoke
*Attorney, Agent, or Firm*—Armstrong, Westerman, Hattori, McLeland & Naughton

[57] ABSTRACT

A polymer composition comprising resin components comprising (a) 5-95 weight % of a polyamide resin, and (b) 5-95 weight % of polyolefin + unsaturated carboxylic acid-modified polyolefin, and (c) additives comprising the following compounds in amounts per 100 parts by weight of the total composition: (1) 0.1-2 parts by weight of a substituted hydrazine: (2) 0.05-2 parts by weight of a hindered phenol compound; (3) 0.05-0.5 parts by weight of a phosphite or phosphonite; and (4) 0.15-1 parts by weight of a thiodipropionate.

3 Claims, 1 Drawing Sheet

POLYMER COMPOSITION

This application is a continuation of application Ser. No. 07/476,901 filed Feb. 8, 1990, and now abandoned.

BACKGROUND OF THE INVENTION

The present invention relates to polymer compositions comprising polyamide resins and polyolefins as main components, and more particularly to polymer compositions comprising polyamide resins and polyolefins as main components, which are excellent not only in heat resistance, chemical resistance and impact resistance, but also in antifreeze resistance and moldability, and further have remarkably improved Geer oven life and copper-contacted Geer oven life.

Containers such as radiator tanks of automobiles have been getting increasingly produced from plastics, for the purpose of reducing their weight. As plastic materials for producing such containers, polyamide resins are highly suitable because they are light and excellent in impact resistance, heat resistance, chemical resistance, etc.

However, despite the fact that polyamide resins, etc. are excellent in heat resistance, mechanical strength and long-term durability, they are generally poor in water resistance, moldability, chemical resistance and antifreeze resistance.

The above desired properties, which are insufficient in the polyamide resins, are generally possessed by polyolefins. Thus, various compositions based on polyamide resins and polyolefins have been proposed.

For instance, Japanese Patent Laid-Open No. 55-165952 discloses a polyamide composition comprising (A) 50–99 parts by weight of a polyamide resin and (B) 50–1 parts by weight of a modified polyolefin or a modified olefin elastomer, which is produced by grafting a polyolefin or an olefin elastomer with 001–10 mol % of at least one of alicylic carboxylic acids containing cis-double bonds and their functional derivatives. This reference also discloses the above polyamide compositions further containing an unmodified polyolefin.

However, the conventional polyamide resin-polyolefin compositions are extremely vulnerable to deterioration when heated for a long period of time particularly in contact with metals such as copper.

OBJECT AND SUMMARY OF THE INVENTION

An object of the present invention is, therefore, to provide polymer compositions having excellent water resistance, moldability and antifreeze resistance owned by polyolefins while retaining excellent properties such as thermal deformation resistance of the polyamide resins, and further provided with remarkably improved resistance to thermal deterioration with or without contact with metals such as copper (expressed by Geer oven life (no contact with metal) and metal-contacted Geer oven life).

As a result of intense research in view of the above object, the inventors have found that by adding not only proper amounts of unsaturated carboxylic acid-modified polyolefins but also particular antioxidants and particular agents for preventing copper-caused deterioration to compositions of polyamide resins and polyolefins, the resulting polymer compositions can be provided with remarkably improved compatibility between the polyamide resins and the polyolefins, thereby showing excellent properties of both components, and also provided with remarkably improved Geer oven life and metal-contacted Geer oven life. The present invention is based on this finding.

Thus, the polymer composition according to the present invention comprises resin components comprising (a) 5–95 weight % of a polyamide resin, and (b) 5–95 weight % of polyolefin + unsaturated carboxylic acid-modified polyolefin, and (c) additives comprising the following compounds in the following amounts per 100 parts by weight of the total composition:
(1) 0.1–2 parts by weight of a substituted hydrazine;
(2) 0.05–2 parts by weight of a hindered phenol compound;
(3) 0.05–0.5 parts by weight of a phosphite or phosphonite; and
(4) 0.15–1 parts by weight of a thiodipropionate.

DETAILED DESCRIPTION OF THE INVENTION

Figure 1:
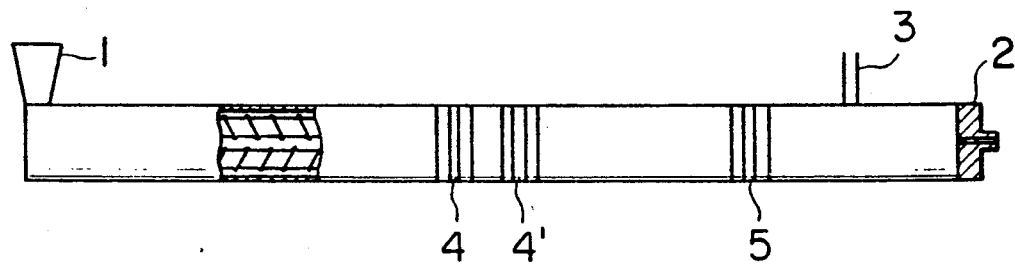
FIG. 1 is a partially cross-sectional schematic side view showing one example of a double-screw extruder for producing the polymer composition according to the present invention.

The polyamide resins which may be used in the present invention include polyamide resins formed from aliphatic, alicyclic or aromatic diamines such as hexamethylenediamine, decamethylenediamine, dodecamethylenediamine, 2,2,4- or 2,4,4-trimethylhexamethylenediamine, 1,3- or 1,4-bis (aminomethyl) cyclohexane, bis (p-aminocyclohexylmethane), m- or p-xylylenediamine, etc., and aliphatic, alicyclic or aromatic dicarboxylic acids such as adipic acid, suberic acid, sebacic acid, cyclohexane dicarboxylic acid, terephthalic acid, isophthalic acid, etc.: polyamide resins formed from amino carboxylic acids such as 6-amino caproic acid, 11-amino undecanoic acid, 12-amino dodecanoic acid, etc.: polyamide resins formed from lactams such as $\epsilon$-caprolactam, $\omega$-dodecalactam, etc.; polyamide copolymers made of these components: and mixtures of these polyamide resins. Specifically, the polyamide resins may be nylon 6, nylon 66, nylon 610, nylon 9, nylon 6/66, nylon 66/610, nylon 6/11, nylon 6/12, nylon 12, nylon 46, an amorphous nylon, etc. Among them, nylon 6 and nylon 66 are particularly preferable from the aspect of good rigidity and heat resistance.

The molecular weights of the polyamide resins are not particularly restricted, but it is preferable to use the polyamide resins with relative viscosities $\eta_r$ (measured in 98% sulfuric acid, JIS K6810) of 1.0 or more. Particularly those having relative viscosities of 2.0 or more are preferable because of their excellent mechanical strength.

The polyolefins which may be used in the present invention include homopolymers of $\alpha$-olefins such as ethylene, propylene, butene-1, pentene-1, hexene-1, 4-methylpentene-1, etc.; copolymers of ethylene and propylene or other $\alpha$-olefins; and copolymers of these $\alpha$-olefins. Among them, various types of polyethylene such as low-density polyethylene, linear low-density polyethylene, medium-density polyethylene and high-density polyethylene, and polypropylene are preferable. When polypropylene is used, it is not restricted to a homopolymer of propylene, and any random or block copolymers of propylene and other α-olefins, in which the propylene content is 50 mol % or more and preferably 80 mol % or more, may be used. The comonomers copolymerizable with propylene are ethylene and other α-olefins, and ethylene is particularly preferable. Accordingly, the term "polypropylene" used herein means that it is not restricted to a homopolymer of propylene but it includes any types of propylene copolymers.

The modified polyolefins which may be used in the present invention mean polyolefins modified with unsaturated carboxylic acids or their anhydrides. The unsaturated carboxylic acids or their anhydrides include monocarboxylic acids such as acrylic acid, methacrylic acid, etc.; dicarboxylic acids such as maleic acid, bicyclo (2,2,1) hept-5-ene-2,3-dicarboxylic acid, fumaric acid, itaconic acid, etc.; dicarboxylic anhydrides such as maleic anhydride, bicyclo [2,2,1] hept-5-ene-2,3-dicarboxylic anhydride (Himic acid), itaconic anhydride, etc., and particularly dicarboxylic acids or their anhydrides are preferable.

The polyolefins to be modified with unsaturated carboxylic acids or their derivatives are, like the above-described polyolefins, not limited to homopolymers of α-olefins but include copolymers of different α-olefins.

The content of unsaturated carboxylic acids or their anhydrides in the modified polyolefins is preferably determined such that a molar ratio of amino groups/carboxylic groups is within the range of 1–10000. Specifically, it is preferably 0.01–15 weight %. When the content of the unsaturated carboxylic acids or their anhydrides grafted is less than 0.01 weight %, the addition of the modified polyolefins does not provide sufficient effect of improving the compatibility of the polyamide resins with polyolefins. On the other hand, when it exceeds 15 weight %, the modified polyolefins show poor compatibility with polyolefins.

The modified polyolefins may be produced by a solution method or a melt-blending method. In the case of a melt-blending method, polyolefins, unsaturated carboxylic acids or their anhydrides for modifying the polyolefins and catalysts are charged into an extruder, a double-screw blender, etc. and blended in a molten state at a temperature of 150°–250° C. Alternatively, in the case of a solution method, the above starting materials are dissolved in organic solvents such as xylene, and a reaction is conducted while stirring at a temperature of 80°–140° C. In any case, the catalysts may be usual radical polymerization catalysts. Specific examples of the catalysts include peroxides such as benzoyl peroxide, lauroyl peroxide, di-tert-butyl peroxide, acetyl peroxide, tert-butyl perbenzoate, dicumyl peroxide, perbenzoic acid, peracetic acid, tert-butyl perpivalate, 2,5-dimethyl-2,5-di-tert-butyl peroxyhexyne, etc.; azo compounds such as azobisisobutyronitrile, etc. The amount of catalysts added is 1–100 parts by weight or so per 100 parts by weight of the unsaturated carboxylic acids or their anhydrides.

In the polymer compositions of the present invention, the polyamide resin is 5–95 weight %, and the polyolefin + the modified polyolefin is 5–95 weight %, based on the resin components. When the polyamide resin is less than 5 weight %, the resulting compositions do not show sufficient heat resistance and mechanical strength, and when it exceeds 95 weight %, the resulting compositions do not show sufficient moldability and chemical resistance, and their production costs become high. The preferred amount of the polyamide resin is 30–90 weight %, and the preferred amount of the polyolefin + the modified polyolefin is 10–70 weight %.

The amount of the modified polyolefin, particularly the content of the carboxyl groups in the modified polyolefin, preferably has a close relation with the content of terminal amino groups in the polyamide resin. It is presumed that in the process of melt-blending, the carboxyl groups in the modified polyolefins are reacted with the terminal amino groups of the polyamide resins to form modified polyolefin-polyamide resin graft copolymers which serve as compatibilizing agents for the polyolefins and the polyamide resins, and that the amount of the graft copolymers formed is closely related with a molar ratio of terminal amino groups of the polyamide resins/carboxyl groups. Accordingly, it is preferable to adjust the amount of the modified polyolefins in the compositions such that the molar ratio of terminal amino groups to the carboxyl groups of the modified polyolefins is within the range of 1–10000. When the amino group/carboxyl group molar ratio is less than 1, too much compatibility is obtained, thereby reducing the heat resistance of the resulting compositions because the properties of the polyamide resins and the polyolefins are averaged. On the other hand, when the amino group/carboxyl group molar ratio exceeds 10000, sufficient compatibilizing effect cannot be obtained by the addition of the modified polyolefins, resulting in compositions with poor mechanical strength. More preferred is a molar ratio of from 10–1000. Incidentally, to meet the above requirements of the molar ratio, the amount of the modified polyolefins is generally 0.1–20 weight %, and preferably 0.5–10 weight % based on the resin components.

In the present invention, to improve the Geer oven life and the metal-contacted Geer oven life, the polymer compositions contain the following compounds:
(1) 0.1–2 parts by weight of a substituted hydrazine;
(2) 0.05–2 parts by weight of a hindered phenol compound;
(3) 0.05–0.5 parts by weight of a phosphite or phosphonite; and
(4) 0.15–1 parts by weight of a thiodipropionate.

The substituted hydrazine used in the present invention may have the following formula:

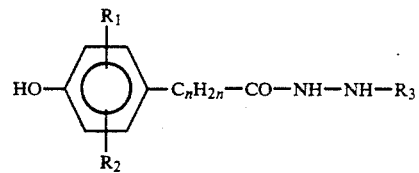

wherein $R_1$ and $R_2$, which may be the same, are alkyl groups of $C_1$–$C_6$; $R_3$ is at least one selected from the group consisting of H, an alkanoyl group of $C_2$–$C_{18}$ and those having the formula represented by:

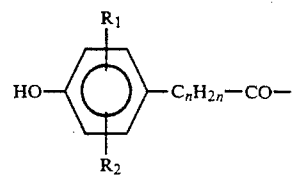

wherein $R_1$ and $R_2$ are the same as above: and n is an integer of 0–5.

Specific examples of the substituted hydrazines include N,N'-bis-[3-(3,5-di-tert-butyl-4-hydroxyphenyl) propionyl] hydrazine; N-stearoyl-N'-[3-(3,5-di-tert-butyl-4-hydroxyphenyl) propionyl] hydrazine; N-(3-13-ethyl-5-tert-butyl-4-hydroxyphenyl) propionyl]-N'-3-(3,5-di-tert-butyl-4-hydroxyphenyl) propionyl hydrazine; N-[3-(3,5-di-tert-butyl-4-hydroxyphenyl) propionyl]-N'-(3,5-di-tert-butyl-4-hydroxybenzoyl) hydrazine; 3-(3,5-diisopropyl-4-hydroxyphenyl) propionyl hydrazine; N-stearoyl-N'-[3-(3,5-diisopropyl-4-hydroxyphenyl) propionyl] hydrazine; 3-(3-methyl-5-tert-hexyl-4-hydroxyphenyl) propionyl hydrazine; N'-octanoyl-N-[3-(3-methyl-5-tert-hexyl-4-hydroxyphenyl) propionyl) hydrazine; 3-(3,5-di-tert-butyl-4-hydroxyphenyl) propionyl hydrazine, etc. Among them, N,N'-bis-(3-(3,5-di-tert-butyl-4-hydroxyphenyl) propionyl) hydrazine is preferable.

The hindered phenol compounds used in the present invention are those having large substituents such as a tert-butyl group, etc. at an ortho-position of the phenolic OH group, to alleviate the influence of the phenolic OH group properties. Their examples include 2,6-di-tert-butyl-4-methylphenol; octadecyl-3-(3,5-di-tert-butyl-4-hydroxyphenyl) propionate: pentaerythrityltetrakis [3-(3,5-di-tert-butyl-4-hydroxyphenyl) propionate]: N,N'-hexamethylene-bis (3,5-di-tert-butyl-4-hydroxy-hydrocinnamide; 1,3,5-tris (3-hydroxy-2,6-dimethyl-4-tert-butylbenzyl) isocyanurate; 1,3,5-tris (3-hydroxy-2,4,6-tris (3,5-di-tert-butyl-4-hydroxybenzyl) benzene; 4,4'-thiobis-(3-methyl-6-tert-butylphenol); 1,1,3-tris (2-methyl-4-hydroxy-5-tert-butylphenyl) butane; tris (3,5-di-tert-butyl-4-hydroxybenzyl) isocyanurate, etc. Among them, pentaerythrityltetrakis (3-(3,5-di-tert-butyl-4-hydroxyphenyl) propionate) and N,N'-hexamethylene-bis (3,5-di-tert-butyl-4-hydroxyhydrocinnamide) are preferable.

The phosphites and the phosphonite compounds used in the present invention may include alkyl phosphites, alkyl aryl phosphites, aryl phosphites, alkyl phosphonites, etc. Their specific examples are distearyl-pentaerythritol diphosphite; tris (2,4-di-tert-butylphenyl) phosphite; tetrakis (2,4-di-tert-butylphenyl)-4,4'-biphenylene phosphite, cyclic neopentane tetraylbis (2,4-di-tert-butylphenyl phosphite): bis (2,6-di-tert-butyl-4-methylphenyl) pentaerythritol-diphosphite: tetrakis (2,4-di-tert-butylphenyl)-4,4'-biphenylene-diphosphonite: 2,2'-ethylidene-bis (4,6-di-tert-butylphenyl) fluorophosphite, etc.

The thiodipropionates used in the present invention include, for instance, dilauryl-thiodipropionate, distearylthiodipropionate, lauryl-stearyl-thiodipropionate, dimyristylthiopropionate, tetrakis-(methylene-3-dodecyl-thiopropionate) methane, etc.

All of the above compounds (1)–(4) are indispensable components. The lack of any one of (1)–(4) leads to the decrease in Geer oven life and metal-contacted Geer oven life. When the contents of the compounds (1)–(4) are smaller than the above-described lower limits, sufficient effects of improving the Geer oven life and the metal-contacted Geer oven life of the polymer compositions cannot be achieved. On the other hand, when the contents of the compounds (1)–(4) exceed the above-described upper limits, the Geer oven life and the metal-contacted Geer oven life rather decrease. The preferred contents of the compounds (1)–(4) are as follows:
(1) 0.3–1.2 parts by weight:
(2) 0.1–1.5 parts by weight;
(3) 0.1–0.25 parts by weight: and
(4) 0.2–0.8 parts by weight.

The polymer compositions of the present invention may further contain other additives such as inorganic fillers, such as talc, mica, wollastonite, thermostabilizers, anti-oxidants, photostabilizers, flame retarders, plasticizers, anti-static agents, parting agents, foaming agents, nucleating agents, etc. to improve their properties.

The polymer compositions of the present invention may be produced as described below.

In the production of the polymer compositions of the present invention, the double-screw extruder satisfying the following requirements is preferably used:

a) Having a hopper, an evacuation vent and a die exit in this order with a length/diameter (L/D) ratio of 25 or more;

b) Having at least one first kneading zone for strongly blending the polyamide resin, polyolefin + modified olefin (hereinafter referred to simply as "polyolefin components"), and the additives at a position within L/D 15 downstream of the hopper. the first kneading zone being constituted by 4 or more kneading discs each having L/D of ¼–⅛;

(c) Having at least one second kneading zone located upstream of the evacuation vent for strongly blending the polyamide resin and the polyolefin components (constituted by 4 or more kneading discs).

With respect to the requirement (a), the hopper is for charging the polyamide resin, the polyolefin and the modified polyolefin into the double-screw extruder, the evacuation vent is for removing low-molecular components generated during the blending of the polyamide resin and the polyolefin components, and the die exit is for extruding the blended compositions in the form of strand.

With respect to the requirement (b), the first kneading zone is for strongly kneading the polyamide resin and the polyolefin components. If necessary, a plurality of the first kneading zones are provided. Each first kneading zone is constituted by 4 or more, particularly 4–16 kneading discs arranged continuously. Each pair of the kneading discs are fixed to two screw shafts, so that they are rotated by the rotation of the screws. Since each kneading disc is in a cam shape, a gap between each pair of the kneading discs is changed by the rotation of the screws. Thus, the polyamide resin and polyolefin components passing therethrough are strongly blended.

With respect to the requirement (c), the second kneading zone is for strongly reblending the polyamide resin and polyolefin components, and its structure itself is essentially the same as the first kneading zone.

The double-screw extruder having the above structural features has a structure as illustrated in FIG. 1. This double-screw extruder preferably has the following structure:
(a) A length/diameter (L/D) ratio of the double-screw extruder is 25 or more;
(b) It has:
  (1) A hopper 1 for charging the polyamide resin and the polyolefin components:
  (2) A die 2 for extruding the polymer compositions;
  (3) An evacuation vent 3 provided between the hopper 1 and the die 2:

(4) At least one first kneading zone 4, 4', . . . (two zones in this Example) provided within L/D 15 downstream of the hopper 1: and (5) At least one second kneading zone 5 provided upstream of the evacuation vent 3:

Its blending conditions are as follows:

(6) The resin temperature during blending by the double-screw extruder is 250°–300° C.

(7) The resin temperature at the die exit is 250°–300° C.

When the L/D ratio of the double-screw extruder is less than 25, sufficient blending cannot be achieved. The preferred L/D ratio is 25–35.

The hopper 1, the evacuation vent 3 and the die 2 may have known structures.

The distance between the hopper 1 and the evacuation vent 3 is L/D 15–20. When it is less than L/D 15, sufficient blending cannot be achieved between the polyamide resin and the polyolefin components. On the other hand, when it exceeds L/D 20, venting up may take place.

Figure 2:
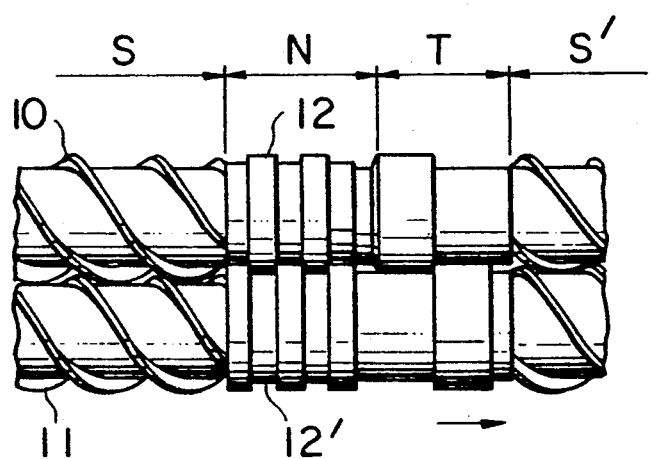
FIG. 2 is a partial enlarged view showing a kneading zone of the double-screw extruder used in the present invention.

Both of the first kneading zones 4, 4' and the second kneading zone 5 are preferably L/D 1–4 and constituted by 4 or more kneading discs each having L/D of ¼–⅛ or so. Incidentally, each kneading zone has preferably the structure as illustrated in FIG. 2.

Figure 3:
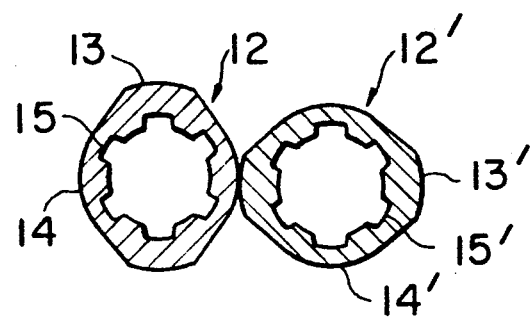
FIG. 3 is a cross-sectional view showing one example of a pair of kneading discs.

Specifically speaking, a plurality of the kneading discs 12, 12' . . . arranged on the intermediate portions of the two screws 10, 11 to form a kneading zone "N," which is sandwiched by screw zones "S," "S'." In the kneading zone "N," kneading discs 12, 12' . . . are arranged in pair, each fixed to each screw shaft. FIG. 3 shows a cross section of a pair of kneading discs 12, 12'. Each kneading disc 12, 12' has a peripheral surface in the form of a cam, each having projecting portions 13, 13' and circular portions 14, 14'. In each pair, the kneading discs 12, 12' are fixed to the screw shafts (not shown) by spline grooves 15, 15', such that each of the projecting portions 13, 13' and each of the circular portions 14, 14' are opposing to each other. Accordingly, in each pair, a gap between the kneading discs 12, 12' drastically changes by the rotation of the screw shafts. As shown in FIG. 2, since a plurality of the kneading discs 12, 12' . . . are arranged continuously, the resin components passing through each pair of the kneading discs (or mixtures of the polyamide resin and the polyolefin components) are subjected to much stronger blending action than by the screws. Incidentally, in FIG. 2, a transition zone (seal ring) "T" is provided downstream of the kneading discs 12, 12' in the kneading zone "N," so that the blended product does not easily go out of the kneading zone.

In the above-described structure, it is necessary that there are at least one, preferably two or more, first kneading zone and at least one second kneading zone.

Without the first kneading zone 4, 4' . . . or if it does not have sufficient length, the polyamide resin and the polyolefin components would not be well blended, so that they are not sufficiently plasticized.

When the second kneading zone 5 has a length smaller than L/D 1 due to the insufficiency of the number of kneading discs, the domain sizes of the polyolefin components do not become uniform.

In general, a front end of the first kneading zone 4, 4' is located at L/D 5–15 downstream of the hopper 1, and the total length of the first kneading zone is L/D 2–8 or so. A front end of the second kneading zone 5 is located at L/D 15–20 downstream of the hopper 1, and the total length of the second kneading zone is L/D 1–4 or so.

When the resin temperature in a zone does not reach the range of 250°–300° C. during blending, a desired morphology cannot be obtained. However, when the resin temperature is too high, the resins may be deteriorated, failing to provide the desired properties.

In the above double-screw extruder, the polyamide resin and the polyolefin components are introduced into the double-screw extruder through the hopper 1, and the two screws are rotated at 100–300 rpm to blend the polyamide resin and polyolefin components. The compositions obtained by blending are extruded through the die exit 2 in the form of strand, and they are cut into pellets.

The polymer compositions of the present invention produced by the above double-screw extruder may easily be formed into desired shapes by a usual injection-molding method.

As described above in detail, although the polyamide resins and the polyolefins themselves do not have good compatibility, their compatibility is improved by the addition of the unsaturated carboxylic acid-modified polyolefins. The reason therefor seems to be that a reaction between the end amino groups of the polyamide resins and the carboxyl groups of the modified polyolefins takes place to form polyamide-modified polyolefin graft copolymers.

In addition, when the compositions of the polyamide resins and the polyolefins are kept in contact with copper, the deterioration of the polyolefins is generally accelerated. However, the addition of the copper deterioration preventing agent (compound (1)) together with the agents for improving the thermal deterioration resistance of the polyolefins (compounds (2)–(4)) serves to drastically improve the metal-contacted resistance (resistance to metal-caused deterioration) and heat resistance of the compositions. The reasons therefor are not necessarily clear, but it may be presumed that a combination of the additive (1) with the additives (2)–(4) synergistically provides the effects of preventing the deterioration of polyolefins, thereby improving the thermal deterioration resistance of the compositions.

The present invention will be described in further detail by the following Examples.

In each Example and Comparative Example, the properties of the polymer compositions were measured as follows:

(1) MFR

Measured at 275° C. under a load of 2160 g according to (2) Thermal deformation temperature A test piece (cantilever) of 110 mm × 4 mm × 12.7 mm was bent under a constant load of 4.6 kg at a constant temperature elevating rate of 2° C./minute, and a temperature at which the test piece was bent by a predetermined amount (0.25 mm) was measured according to JIS K7207.

(3) Tensile strength

Measured at 23° C. according to JIS K 7113.

(4) Flexural modulus

Measured at 23° C. according to JIS K 7203.

(5) Izod impact strength

Measured at 23° C. and −40° C. respectively, according to JIS K 7110.

(6) Geer oven life

After heating a test piece in a Geer oven at 150° C. for 2000 hours, a tensile strength retention ratio was measured.

(7) Copper-contacted Geer oven life

A test piece was sandwiched by copper pieces on both surfaces, and the same test as in (6) was conducted.

Incidentally, in the tests (3)–(5), they were measured both under dry conditions and under water-absorbed conditions. The dry conditions mean that an injection-molded test piece was placed in a desiccator and kept at 23° C. for 75 hours, and the water-absorbed conditions mean that the injection-molded test piece was immersed in water at 100° C. for 24 hours.

EXAMPLES 1–6, COMPARATIVE EXAMPLES 1–5

Nylon, polypropylene, modified polypropylene and additives were dry-blended in a high-speed mixer in proportions shown in Table 1, and introduced into a double-screw extruder of 45 mm in inner diameter through its main hopper. They were blended at 280° C. to produce composition pellets.

The composition pellets were dried in a drying furnace, and then formed into test pieces by injection molding to measure the properties shown in Table 1. The results are shown in Table 1.

TABLE 1

| | Example No. | | | | | |
|---|---|---|---|---|---|---|
| | 1 | 2 | 3 | 4 | 5 | 6 |
| COMPOSITION (wt. %)[1] | | | | | | |
| Nylon 66[2] | 60 | 60 | 60 | 29 | 84 | 60[10] |
| Polyethylene[3] | 35 | 35 | 35 | 68 | 9 | 35 |
| Modified Polyethylene | | | | | | |
| Type of Acid | MAH[4] | MAH | MAH | MAH | MAH | MAH |
| Grafted Acid Content | 0.2 | 0.2 | 0.2 | 0.2 | 0.2 | 0.2 |
| Content | 5 | 5 | 5 | 3 | 7 | 5 |
| Molar Ratio of Amino Group/Carboxyl Group | 24 | 24 | 24 | 24 | 24 | 24 |
| Additive A[5] | 0.5 | 1.0 | 1.0 | 1.0 | 1.0 | 1.0 |
| B[6] | 0.5 | 1.0 | 0 | 1.0 | 1.0 | 1.0 |
| C[7] | 0.1 | 0.2 | 0.2 | 0.2 | 0.2 | 0.2 |
| D[8] | 0.1 | 0.2 | 0.2 | 0.2 | 0.2 | 0.2 |
| E[9] | 0.3 | 0.6 | 0.6 | 0.6 | 0.6 | 0.6 |
| PROPERTIES | | | | | | |
| MFR (g/10 minutes) | 24 | 24 | 24 | 10 | 42 | 13 |
| Thermal Deformation Temp. (°C.) | 190 | 190 | 190 | 80 | 230 | 180 |
| Under Dry Conditions | | | | | | |
| Tensile Strength (23° C.) (kg/cm$^2$) | 850 | 850 | 850 | 450 | 1100 | 800 |
| Flexural Modulus (23° C.) (kg/cm$^2$) | 28000 | 28000 | 28000 | 19000 | 31000 | 26000 |
| Izod Impact Strength (kg · cm/cm) | | | | | | |
| (23° C.) | 10 | 10 | 10 | 7 | 9 | 10 |
| (−40° C.) | 8 | 8 | 8 | 4 | 7 | 8 |
| Under Water-Absorbed Conditions | | | | | | |
| Tensile Strength (23° C.) (kg/cm$^2$) | 700 | 700 | 700 | 450 | 650 | 650 |
| Flexural Modulus (23° C.) (kg/cm$^2$) | 24000 | 24000 | 24000 | 18000 | 23000 | 23000 |
| Izod Impact Strength (kg · cm/cm) (23° C.) | 16 | 16 | 16 | 7 | 18 | 16 |
| Geer Oven Life (%) | 95 | 98 | 90 | 95 | 100 | 98 |
| Copper-Contacted Geer Oven Life (%) | 90 | 95 | 88 | 90 | 100 | 95 |

| | Comparative Example No. | | | | |
|---|---|---|---|---|---|
| | 1 | 2 | 3 | 4 | 5 |
| COMPOSITION (wt. %)[1] | | | | | |
| Nylon 66[2] | 60 | 60 | 60 | 60 | 60 |
| Polyethylene[3] | 35 | 35 | 35 | 35 | 35 |
| Modified Polyethylene | | | | | |
| Type of Acid | MAH[4] | MAH | MAH | MAH | MAH |
| Grafted Acid Content | 0.2 | 0.2 | 0.2 | 1.0 | 1 |
| Content | 5 | 5 | 5 | 5 | 5 |
| Molar Ratio of Amino Group/Carboxyl Group | 24 | 24 | 24 | 4.8 | 4.8 |
| Additive A[5] | 0 | 1.0 | 0 | 1.0 | 0 |
| B[6] | 0 | 0 | 1.0 | 0 | 1.0 |
| C[7] | 0 | 0 | 0 | 0.2 | 0.2 |
| D[8] | 0 | 0 | 0 | 0.2 | 0.2 |
| E[9] | 0 | 0 | 0 | 0.6 | 0.6 |
| PROPERTIES | | | | | |
| MFR (g/10 minutes) | 24 | 24 | 24 | 7 | 7 |

TABLE 1-continued

| | | | | | |
|---|---|---|---|---|---|
| Thermal Deformation Temp. (°C.) Under Dry Conditions | 190 | 190 | 190 | 80 | 80 |
| Tensile Strength (23° C.) (kg/cm²) | 850 | 850 | 850 | 600 | 600 |
| Flexural Modulus (23° C.) (kg/cm²) | 28000 | 28000 | 28000 | 25000 | 25000 |
| Izod Impact Strength (kg · cm/cm) | | | | | |
| (23° C.) | 10 | 10 | 10 | 7 | 7 |
| (−40° C.) | 8 | 8 | 8 | 5 | 5 |
| Under Water-Absorbed Conditions | | | | | |
| Tensile Strength (23° C.) (kg/cm²) | 700 | 700 | 700 | 600 | 600 |
| Flexural Modulus (23° C.) (kg/cm²) | 24000 | 24000 | 24000 | 22000 | 22000 |
| Izod Impact Strength (kg · cm/cm) (23° C.) | 16 | 16 | 16 | 12 | 12 |
| Geer Oven Life (%) | 70 | 60 | 60 | 80 | 80 |
| Copper-Contacted Geer Oven Life (%) | 40 | 60 | 50 | 80 | 60 |

Note:
[1] The contents of nylon, polypropylene and modified polypropylene are expressed by weight % based upon resin components.
[2] Amiran CM 3001N manufactured by Toray Industries, Inc. and containing terminal amino groups in an amount of 0.034 milliequivalent/g measured according to a Korshak-Zamyationa method (back titration method) (Chem. Abs. 40, 4665, '46, ibid 42, 6152, '48).
[3] J-215 manufactured by Tonen Sekiyukagaku K.K.
[4] Maleic anhydride.
[5] N,N'-bis [3-(3,5-di-tert-butyl-4-hydroxyphenyl) propionyl] hydrazine (Irganox MD 1024 manufactured by Ciba-Geigy).
[6] N,N'-hexamethylene-bis (3,5-di-tert-butyl-4-hydroxy-hydrocinnamide) (Irganox 1098 manufactured by Ciba-Geigy).
[7] Pentaerythrityl-tetrakis [3-(3,5-di-tert-butyl-4-hydroxyphenyl) propionate] (Irganox 1010 manufactured by Ciba-Geigy).
[8] Distearyl-pentaerythritol diphosphite (MARK PEP-8 manufactured by Adeka Argus Chemical Co., Ltd.).
[9] Distearyl-3,3'-thiodipropionate (Sumilizer TPS manufactured by Sumitomo Chemical Co., Ltd.).
[10] Nylon 6, Amiran CM 1017 manufactured by Toray Industries, Inc. and containing terminal amino groups in an amount of 0.026 milliequivalent/g measured according to a Korshak-Zamyationa method (back titration method) as in (2).

EXAMPLES 7 and 8

Polymer compositions were produced under the same conditions as in Examples 1-3 except for changing polypropylene 7 conditions as to high-density polyethylene (J-6311, manufactured by Tonen Sekiyukagaku K. K.) and using as modified polyethylene the above high-density polyethylene modified with carboxylic acid shown in Table 2. The same tests as in Examples 1-3 were conducted. The results are shown in Table 2.

EXAMPLE 9

A polymer composition further containing talc to that of Example 2 is shown in Table 2.

TABLE 2

| | Example No. | | |
|---|---|---|---|
| | 7 | 8 | 9 |
| COMPOSITION (wt. %)[1] | | | |
| Nylon 66[2] | 60 | 60 | 60 |
| Polyethylene[3] | 35 | 35 | 35 |
| Modified Polyethylene | | | |
| Type of Acid | MAH[4] | MAH | MAH |
| Grafted Acid Content | 0.2 | 0.2 | 0.2 |
| Content | 5 | 5 | 5 |
| Molar Ratio of Amino Group/Carboxyl Group | 24 | 24 | 24 |
| Additive A[5] | 0.5 | 1.0 | 1.0 |
| B[6] | 0.5 | 1.0 | 1.0 |
| C[7] | 0.1 | 0.2 | 0.2 |
| D[8] | 0.1 | 0.2 | 0.2 |
| E[9] | 0.3 | 0.6 | 0.6 |
| Talc[10] | — | — | 30 |
| PROPERTIES | | | |
| MFR (g/10 minutes) | 40 | 40 | 12 |
| Thermal Deformation Temp. (°C.) | 190 | 190 | 240 |
| Under Dry Conditions | | | |
| Tensile Strength (23° C.) (kg/cm²) | 700 | 700 | 900 |
| Flexural Modulus (23° C.) (kg/cm²) | 21000 | 21000 | 51000 |
| Izod Impact Strength (kg · cm/cm) | | | |
| (23° C.) | 12 | 12 | 5 |
| (−40° C.) | 10 | 10 | 4 |
| Under Water-Absorbed Conditions | | | |
| Tensile Strength (23° C.) (kg/cm²) | 600 | 600 | 850 |
| Flexural Modulus (23° C.) (kg/cm²) | 18000 | 18000 | 45000 |
| Izod Impact Strength (kg · cm/cm) (23° C.) | 14 | 14 | 10 |
| Geer Oven Life (%) | 100 | 100 | 95 |
| Copper-Contact Geer Oven Life (%) | 90 | 95 | 90 |

Note:
[1],[2],[4]–[9] Same as in Table 1.
[3] High-density polyethylene (J-6311 manufactured by Tonen Sekiyukagaku K.K.).
[10] LMR-100 manufactured by Fuji Talc K.K.

As is clear from the above results, since the polymer compositions of the present invention contain not only the unsaturated carboxylic acid-modified polyolefins serving to increase the compatibility of the polyamide resins and the polyolefins but also the above additives, they show not only excellent mechanical strength, heat resistance, moldability, antifreeze resistance, etc., but also remarkably improved Geer oven life and copper-contacted Geer oven Life.

As described above in detail, the polymer compositions of the present invention are excellent not only in mechanical strength such as tensile strength and impact strength but also in heat resistance and moldability. Further, they show remarkably improved Geer oven life (aging resistance) and metal-contacted Geer oven life (resistance to metals such as copper). Accordingly, even though commercially available nylon containing copper-including additives are used to prepare polymer compositions, they show good durability under the conditions of contact with copper because they have high resistance to copper-caused deterioration.

Such polymer compositions of the present invention are highly suitable for parts for industrial machinery, automobiles, electric appliances, etc.

What is claimed is:

1. A polymer composition comprising resin components comprising (a) 30-90 weight % of a polyamide resin, and (b) 10-70 weight % of polyolefin + unsaturated carboxylic acid-modified polyolefin, the amount of said unsaturated carboxylic acid-modified polyolefin being less than that of said polyolefin and being 0.5-10 weight % of (a) and (b), and (c) additives comprising the following compounds in the following amount per 100 parts by weight of the total composition:
   (1) 0.1-2 parts by weight of a substituted hydrazine;
   (2) 0.05-2 parts by weight of a hindered phenol compound;
   (3) 0.05-0.5 parts by weight of a phosphite or phosphonite; and
   (4) 0.15-1 parts by weight of a thiodipropionate, wherein a molar ratio of amino groups of the polyamide resin to the carboxyl groups of the modified polyolefin is 10 to 1,000.

2. The polymer composition according to claim 1, wherein said substituted hydrazine is 0.3-1.2 parts by weight, said hindered phenol compound is 0.1-1.5 parts by weight, said phosphite or phosphonite is 0.1-0.25 parts by weight, and said thiodipropionate is 0.2-0.8 parts by weight.

3. The polymer composition according to claim 1, wherein the amount of said polyamide resin is 60-84 weight %, the amount of said polyolefin is 9-35 weight %, and the amount of said unsaturated carboxylic acid-modified polyolefin is 5-7 weight %.

* * * * *